United States Patent [19]

Cowger

[11] Patent Number: 4,961,076

[45] Date of Patent: Oct. 2, 1990

[54] RELIABILITY IMPROVEMENT FOR INK JET PENS

[75] Inventor: Bruce Cowger, Corvallis, Oreg.

[73] Assignee: Hewlett-Packard Company, Palo Alto, Calif.

[21] Appl. No.: 292,585

[22] Filed: Dec. 30, 1988

Related U.S. Application Data

[63] Continuation-in-part of Ser. No. 286,567, Dec. 16, 1988, Continuation-in-part of Ser. No. 115,013, Oct. 28, 1987.

[51] Int. Cl.⁵ .............................................. G01D 15/18

[52] U.S. Cl. ........................................ 346/1.1; 346/75; 346/140 A; 346/140 R

[58] Field of Search ....................... 346/1.1, 75, 140 R, 346/140 A

[56] References Cited

U.S. PATENT DOCUMENTS

| | | | |
|---|---|---|---|
| 3,296,624 | 1/1967 | Ascoli | 346/140 A |
| 3,452,361 | 6/1969 | Williams, Jr. | 346/140 A |
| 4,272,773 | 6/1981 | Halasz | 346/140 R |
| 4,296,421 | 10/1981 | Hara et al. | 346/140 R |
| 4,313,124 | 1/1982 | Hara | 346/140 R |
| 4,342,042 | 7/1982 | Cruz-Uribe et al. | 346/140 R |
| 4,376,283 | 3/1983 | Bower | 346/140 R |
| 4,412,232 | 10/1983 | Weber et al. | 346/140 R |
| 4,419,678 | 12/1983 | Kasugayama et al. | 346/140 R |
| 4,422,084 | 12/1983 | Saito | 346/140 R |
| 4,436,439 | 3/1984 | Koto | 400/126 |
| 4,490,728 | 12/1984 | Vaught et al. | 346/1.1 |
| 4,500,895 | 2/1985 | Buck et al. | 346/140 R |
| 4,509,062 | 4/1985 | Low et al. | 346/140 R |
| 4,539,568 | 9/1985 | Lewis et al. | 346/1.1 |
| 4,571,599 | 2/1986 | Rezanka | 346/140 R |
| 4,677,447 | 6/1987 | Nielsen | 346/140 R |
| 4,714,937 | 12/1987 | Kaplinsky | 346/140 R |

OTHER PUBLICATIONS

Durbeck, Robert C., et al., "Ink Jet Printing", *Output Hardcopy Devices*, Academic Press, Inc., 1988, Chapter 13, pp. 311-370.

Hewlett-Packard Journal, vol. 36, No. 5, May, 1985, pp. 1-27.

*Primary Examiner*—Bruce A. Reynolds
*Assistant Examiner*—Gerald E. Preston

[57] ABSTRACT

An ink jet pen includes an ink reservoir for containing ink and a catchbasin coupled to the reservoir by an orifice for containing ink displaced from the reservoir by environmental conditions. Also coupling the reservoir and catchbasin is an ink return mechanism that permits substantially all of the ink that may be displaced to the catchbasin to be returned to the reservoir regardless of the pen's orientation.

4 Claims, 4 Drawing Sheets

RELIABILITY IMPROVEMENT FOR INK JET PENS

RELATED APPLICATION DATA

This application is a continuation-in-part of copending application Ser. No. 07/286,567, filed Dec. 16, 1988 by Cowger and entitled "VOLUMETRICALLY EFFICIENT INK JET PEN CAPABLE OF EXTREME ALTITUDE AND TEMPERATURE EXCURSIONS," which in turn is a continuation in part of copending application Ser. No. 115,013 filed Oct. 28, 1987 by Hanson et al and entitled "BALANCED CAPILLARY INK JET PEN FOR INK JET PRINTING SYSTEMS." The disclosures of both of these applications are incorporated herein by reference.

FIELD OF THE INVENTION

The present invention relates to ink jet printing systems, and more particularly to a method and apparatus for preventing residual ink from accumulating in and eventually overflowing the catchbasin of an ink jet pen during repeated environmental excursions.

BACKGROUND AND SUMMARY OF THE INVENTION

Ink jet printers have become very popular due to their quiet and fast operation and their high print quality on plain paper. A variety of ink jet printing methods have been developed.

In one ink jet printing method, termed continuous jet printing, ink is delivered under pressure to nozzles in a print head to produce continuous jets of ink. Each jet is separated by vibration into a stream of droplets which are charged and electrostatically deflected, either to a printing medium or to a collection gutter for subsequent recirculation. U.S. Pat. No. 3,596,275 is illustrative of this method.

In another ink jet printing method, termed electrostatic pull printing, the ink in the printing nozzles is under zero pressure or low positive pressure and is electrostatically pulled into a stream of droplets. The droplets fly between two pairs of deflecting electrodes that are arranged to control the droplets' direction of flight and their deposition in desired positions on the printing medium. U.S. Pat. No. 3,060,429 is illustrative of this method.

A third class of methods, more popular than the foregoing, is known as drop-on-demand printing. In this technique, ink is held in the pen at below atmospheric pressure and is ejected by a drop generator, one drop at a time, on demand. Two , principal ejection mechanisms are used: thermal bubble and piezoelectric pressure wave. In the thermal bubble systems, a thin film resistor in the drop generator is heated and causes sudden vaporization of a small portion of the ink. The rapidly expanding ink vapor displaces ink from the nozzle causing drop ejection. U.S. Pat. No. 4,490,728 is exemplary of such thermal bubble drop-on-demand systems. In the piezoelectric pressure wave systems, a piezoelectric element is used to abruptly compress a volume of ink in the drop generator, thereby producing a pressure wave which causes ejection of a drop at the nozzle. U.S. Pat. No. 3,832,579 is exemplary of such piezoelectric pressure wave drop-on-demand systems.

The drop-on-demand techniques require that under quiescent conditions the pressure in the ink reservoir be below ambient so that ink is retained in the pen until it is to be ejected. The amount of this "underpressure" (or "partial vacuum") is critical. If the underpressure is too small, or if the reservoir pressure is positive, ink tends to escape through the drop generators. If the underpressure is too large, air may be sucked in through the drop generators under quiescent conditions. (Air is not normally sucked in through the drop generators because the drop generators comprise capillary tubes which are able to draw ink against the partial vacuum of the reservoir.)

The underpressure required in drop-on-demand systems can be obtained in a variety of ways. In one system, the underpressure is obtained gravitationally by lowering the ink reservoir so that the surface of the ink is slightly below the level of the nozzles. However, such positioning of the ink reservoir is not always easily achieved and places severe constraints on print head design. Exemplary of this gravitational underpressure technique is U.S. Pat. No. 3,452,361.

Alternative techniques for achieving the required underpressure are shown in U.S. Pat. No. 4,509,062 and in copending application Ser. No. 07/115,013 filed Oct. 28, 1987, both assigned to the present assignee. In the former patent, the underpressure is achieved by using a bladder type ink reservoir which progressively collapses as ink is drawn therefrom. The restorative force of the flexible bladder keeps the pressure of the ink in the reservoir slightly below ambient. In the system disclosed in the latter patent application, the underpressure is achieved by using a capillary reservoir vent tube that is immersed in ink in the ink reservoir at one end and coupled to an overflow catchbasin open to atmospheric pressure at the other. The capillary attraction of ink away from the reservoir induces a slightly negative pressure in the reservoir. This underpressure increases as ink is ejected from the reservoir. When the underpressure reaches a threshold value, it draws a small volume of air in through the capillary tube and into the reservoir, thereby preventing the underpressure from exceeding the threshold value.

While the foregoing two approaches for maintaining reservoir underpressure have proven highly satisfactory and unique in many respects, they nonetheless have certain drawbacks. For example, in the pen described in the above-referenced patent, as the flexible bladder reaches its fully collapsed state, the underpressure increases to the point that the drop generator can no longer draw ink therefrom and printing ceases with unused ink left in the bladder. The pen described in the above-referenced application is limited in the temperature and altitude extremes to which it can function properly. For example, if such a pen is transported in an aircraft cabin that is pressurized to an 8000 foot elevation, any air in the ink reservoir will expand in volume by a factor of approximately one third. If the volume of air in the reservoir is more than three times the volume of the catchbasin to which overflow from the capillary reservoir vent tube is routed, the air's expansion will drive more ink into the catchbasin than it can contain and the catchbasin will overflow. This problem can be solved by making the catchbasin large enough to contain the ink in any possible altitude or temperature circumstance, for example, by making the size of the catchbasin fully 35 percent the size of the ink reservoir.

Even this solution, however, is not wholly satisfactory. The only means of returning ink from the catchbasin to the reservoir is a drop tube extending therebetween. In most orientations, the ink in the catchbasin cannot all be returned to the reservoir as the reservoir's air volume shrinks because the catchbasin's ink level will fall below the end of the drop tube. In such case, air will be sucked into the reservoir through the exposed end of the tube. It can be appreciated that a second expansion of the air in the reservoir (due to increasing altitude or temperature) will pump more ink into the catchbasin than previously since the volume of air in the reservoir has increased. Furthermore, the catchbasin already contains some ink from the previous altitude or temperature cycle. Consequently, the second altitude or temperature excursion may fill the catchbasin beyond its capacity, forcing ink out the catchbasin's vent tube and out of the pen, a very undesirable outcome. Each subsequent environmental cycle exacerbates the problem.

It is an object of the present invention to provide an ink jet pen that overcomes this problem.

It is a more particular object of the present invention to provide an ink jet pen that can undergo repeated altitude and temperature excursions without leaking ink.

According to one embodiment of the present invention, an ink jet pen is provided with a plurality of ink pickup tubes that extend from the pen's ink reservoir down into different regions of its catchbasin. The pickup tubes are arranged so that, if there is any ink left in the catchbasin, one of the tubes will be located so that its end is immersed in the ink, permitting the tube to draw the ink back into the reservoir, regardless of the pen's orientation.

The foregoing and additional objects, features and advantages of the present invention will be more readily apparent from the following detailed description, which proceeds with reference to the accompanying drawings.

DETAILED DESCRIPTION

Figure 1A:
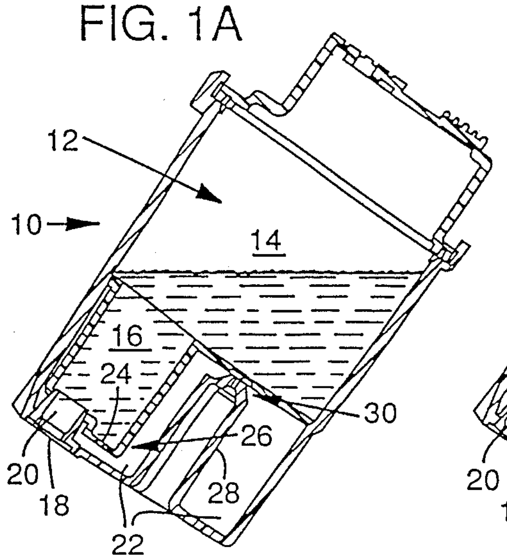
FIG. 1A shows the distribution of ink in a pen prior to of air in the pen's reservoir.

FIGS. 1A-1D show a pen 10 as claimed in U.S. application Ser. No. 115,013 in four different stages of operation. The pen basically includes an ink reservoir 12 having a main upper portion 14 and an ink well 16 extending downwardly therefrom. A drop generator assembly 18 is fed with ink from the well through a filter 20 and serves to eject ink towards a printing medium.

Adjacent the ink well 16 and below the main portion 14 of the reservoir is a catchbasin 22. The catchbasin 22 and the reservoir 12 are coupled by an orifice 24 that is located at the bottom of a drop tube portion 26 of the ink well 16. A vent chimney 28 extends upwardly from the base of the pen and has a vent opening 30 at the top thereof to vent the catchbasin to the surrounding atmosphere.

The catchbasin 22 and orifice 24 cooperate to perform two functions. First, during normal operation, the orifice 24 introduces air in the form of bubbles from the catchbasin into the reservoir 12. These air bubbles moderate the reservoir underpressure caused by the ejection of drops by the drop generator 18 and serve to regulate the underpressure at the orifice's "bubble point" pressure. (For this reason, the orifice is sometimes termed a "bubble generator.") Second, the orifice provides a conduit through which ink can flow between the reservoir and the catchbasin in response to environmental conditions.

The illustrated pen, while offering numerous advantages over the prior art, tends to accumulate ink in its catchbasin if subjected to repeated environmental excursions. An exemplary environmental excursion may be a flight on a commercial airliner in which the pen, whether carried in the cabin or in the cargo hold, may be subjected to a pressurization corresponding to 8000 feet of altitude. At such altitude, any air in the ink reservoir expands in volume by about 33 percent and drives a corresponding volume of ink through the orifice 24 and into the catchbasin. To insure adequate capacity in the catchbasin to contain this ink, the catchbasin may be designed to have a volume roughly a third that of the reservoir. In such an embodiment, the catchbasin can contain the displaced ink regardless of the pen's spatial orientation or the fraction of the reservoir that is air.

When the environmental conditions thereafter return to their original state, such as by the airliner returning to sea level, the air in the reservoir contracts to its original volume. The contraction of this air draws ink from the catchbasin back into the reservoir through the orifice 24. However, the orifice 24 is only effective to draw ink back into the reservoir so long as it is wetted by ink in the catchbasin. After the level of ink in the catchbasin falls below this point, any further contraction of air in the reservoir draws air, rather than ink, into the reservoir. Any ink left in the catchbasin is orphaned.

If the pen is thereafter subjected to another environmental excursion, the catchbasin may no longer be large enough to contain the ink displaced from the reservoir since a residual amount of ink is left from the prior excursion. Each subsequent excursion leaves a still greater cumulative volume of orphaned ink in the catchbasin, further diminishing its capacity. Eventually, the catchbasin overflows and ink drains out the vent chimney where it can contact the user.

Figure 1B:
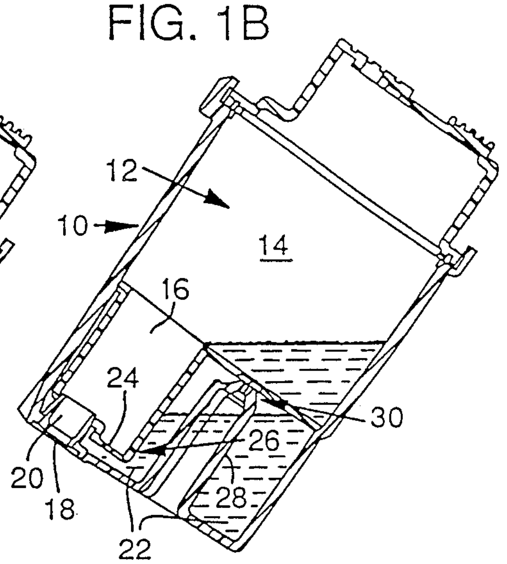
FIG. 1B shows the distribution of ink in a pen after the air in the pen's reservoir has expanded a first time and has pushed ink into the catchbasin.
Figure 1C:
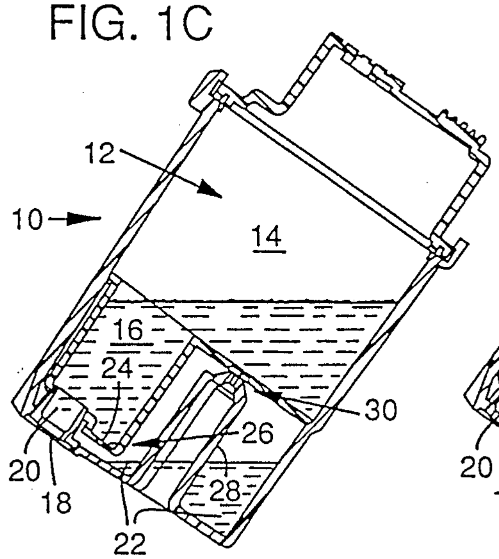
FIG. 1C shows the distribution of ink in a pen after the air in the pen's reservoir has contracted and has drawn some, but not all, of the ink in the catchbasin back into the reservoir.
Figure 1D:
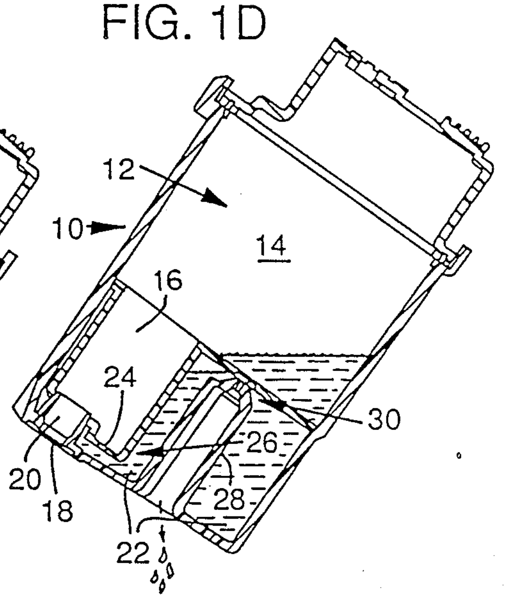
FIG. 1D shows the distribution of ink in (and leaking out) of a pen after the air in the pen's reservoir has expanded a second time and has pushed ink into the catchbasin and caused the catchbasin to overflow.

This series of events is illustrated in the sequence of FIGS. 1A–1D. FIG. 1A shows the pen 10 prior to any expansion of air in the pen's reservoir 12. FIG. 1B shows the pen after the air in the pen's reservoir has expanded a first time and has pushed ink into the catchbasin 22. FIG. 1C shows the pen after the air in the pen's reservoir has contracted and has drawn some, but not all, of the ink in the catchbasin back into the reservoir. (The spatial orientation of the pen prevented the orifice 24 from fully draining the catchbasin.) Finally, FIG. 1D shows the pen after the air in the pen's reservoir has expanded a second time and has pushed ink into the catchbasin and caused the catchbasin to overflow through the vent chimney.

To overcome the above-described problem, the present invention provides means to fully drain the catchbasin each cycle, regardless of the pen's orientation. In the embodiment 40 of the invention illustrated in FIG. 2, this means comprises a plurality of small tubes 42, termed ink pickups, that are formed into the partition 44 between the reservoir and the catchbasin and extend into the corners 46 of the catchbasin. (Only two of the four corners 46 of the catchbasin are shown in the sectional view of FIG. 2.) Regardless of the pen's orientation, at least one of these pickups will remain wetted and effective until the catchbasin is fully drained.

The pickups 42 can take a number of forms. Exemplary are molded plastic tubes that are lanced at their ends to form one or more orifice 48, or tubes that are open at their ends and bonded to woven screens. In other forms, the pickups can be made of capillary matrix materials, such as foam, porous metal, or glass fiber bundles. The only constraint is that the pickups should retain ink under all reasonable conditions, as discussed below.

Figure 2:
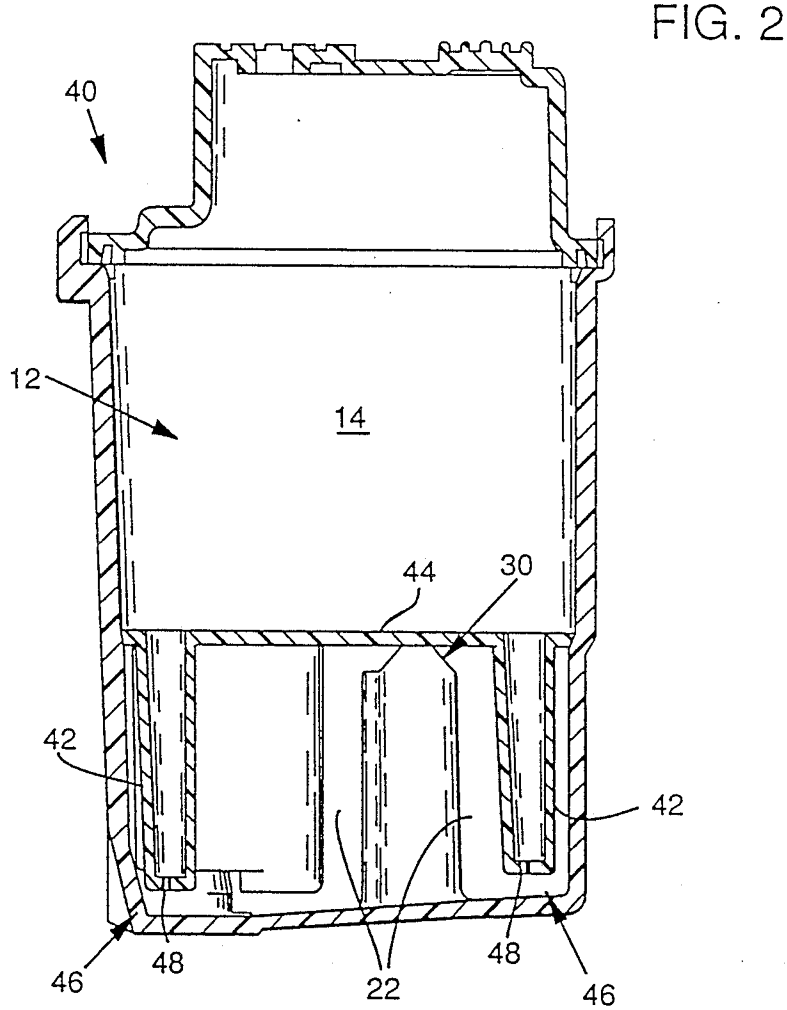
FIG. 2 is a side sectional view of a pen according to one embodiment of the present invention, showing two of four ink pickup tubes.

Desirably, ink should not accumulate in the catchbasin regardless of the pen's spatial orientation. To illustrate, consider the extreme situation in which the pen 40 of FIG. 2 is fully inverted, with the catchbasin 22 above the reservoir 12. If the catchbasin is devoid of ink and an environmental excursion causes air in the reservoir to expand, the expanding air is itself expelled out the orifice 24 and out the vent chimney 28. The inverted orientation of the pen keeps all of the ink in the reservoir.

Figure 3A:
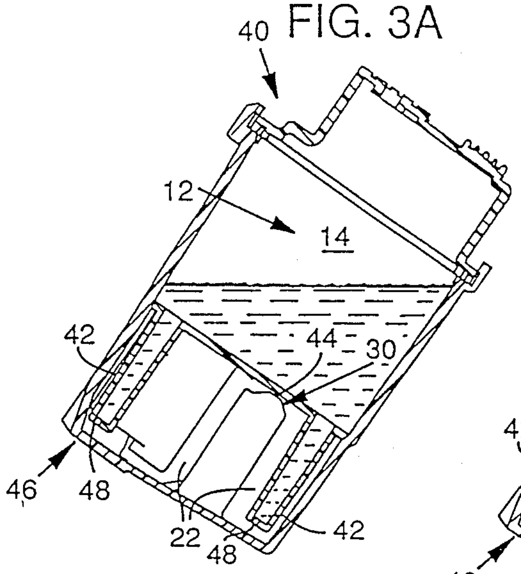
FIG. 3A shows the distribution of ink in the pen of FIG. 2 prior to any expansion of air in the pen's reservoir.
Figure 3B:
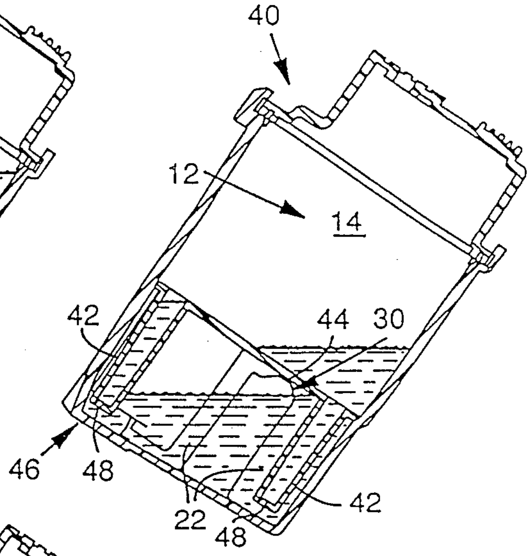
FIG. 3B shows the distribution of ink in the pen of FIG. 2 after the air in the pen's reservoir has expanded a first time and has pushed ink into the catchbasin.
Figure 3C:
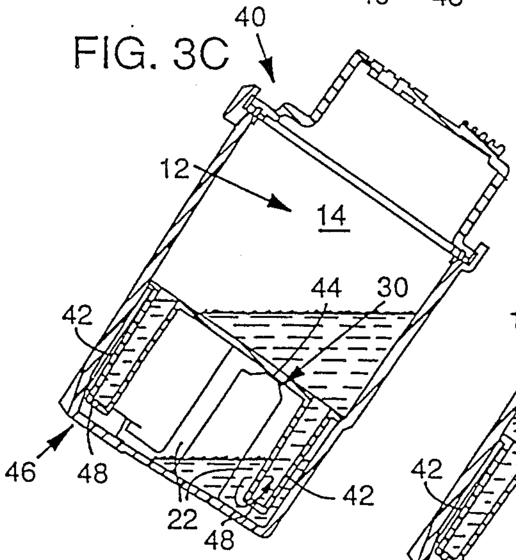
FIG. 3C shows the distribution of ink in the pen of FIG. 2 as the air in the pen's reservoir contracts and draws ink up the wetted drop tube.
Figure 3D:
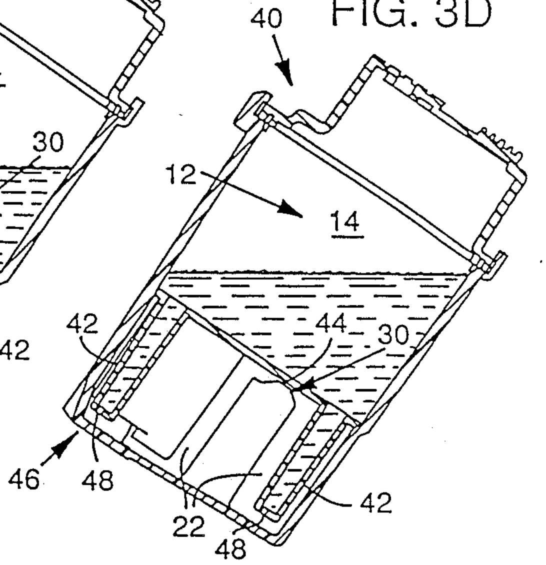
FIG. 3D shows the distribution of ink in the pen of FIG. 2 after the air in the pen's reservoir has fully contracted and withdrawn all of the ink in the catchbasin back to the reservoir.
Figure 4A:
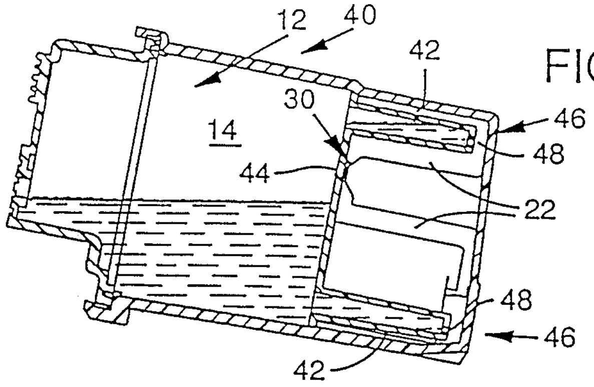
FIGS. 4A through 4D are similar to FIGS. 3A through 3D and show the pen in the same four stages of operation, but at a different angular orientation to demonstrate the operability of the present invention over a wide range of orientations.
Figure 4B:
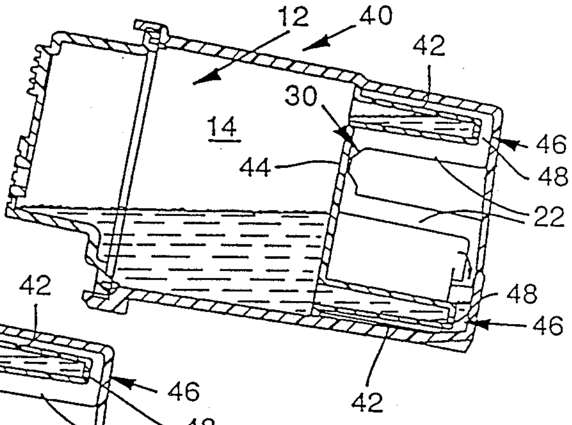
Figure 4C:
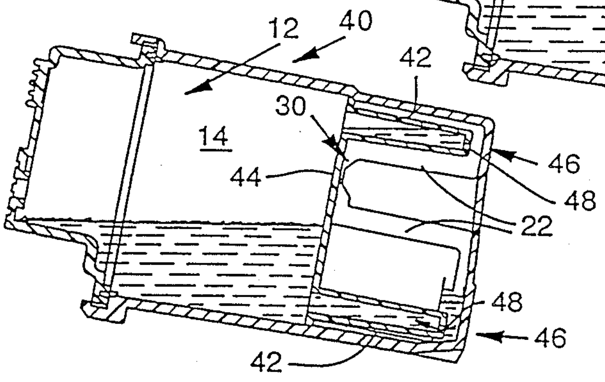
Figure 4D:
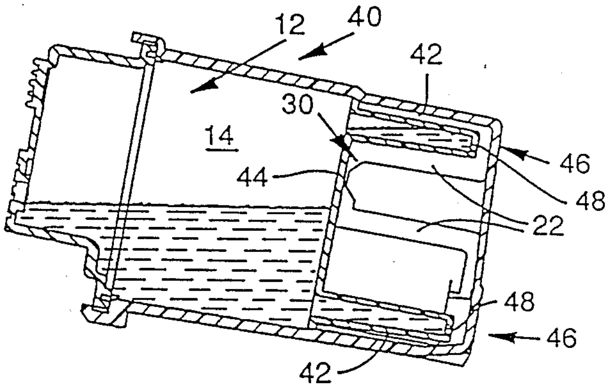

If the pen is oriented as illustrated in FIG. 3A–3D, expanding air in the reservoir pushes ink through the bubble generator orifice 24 and into the catchbasin 22 where it pools, as shown in FIG. 3B. Ink is not pushed out the reservoir through the ink pickups 42 unless their ends are wetted. That is, the capillarity that exists at the air/ink interface at the end of an unwetted pickup tube is normally sufficient to effectively seal the tube and prevent ink from draining from the tube to the catchbasin. If, however, the end of a pickup tube is wetted by ink in the catchbasin, then there is no air/ink interface and thus no capillarity. Ink can then flow through the pickups and into the catchbasin.

Returning to the situation illustrated in FIG. 3B, as expansion of air in the reservoir drives ink through the orifice 24 and into the catchbasin, the level of ink in the catchbasin rises and soon wets the ends of one or more of the ink pickup tubes. When wetted, ink will flow out the tube(s), its flow governed by viscous drag forces in the tube and at the small orifice or orifii at the tube's end, and by the pressure differential between the reservoir and the catchbasin.

When environmental conditions thereafter cause the air volume in the reservoir to contract, the pressure in the reservoir falls below that in the catchbasin. Ink pickups whose ends are immersed in ink will allow this ink to flow back into the reservoir, subject to viscous drag. The pen designer must take care that the ink flow rate through each ink pickup can match the maximum possible rate of contraction of the reservoir air without the pressure differential across that pickup (equal to the pressure differential between the catchbasin and reservoir) exceeding the bubble point of the bubble generator orifice 24. If this bubble pressure is exceeded, the pen will preferentially draw air into the reservoir through the bubble generator orifice instead of drawing ink back into the reservoir through the ink pickup tubes. The volume of air introduced in this manner will leave a corresponding volume of ink in the catchbasin when the pen reaches equilibrium.

If one of the ink pickups is immersed in ink but the bubble generator orifice 24 is not, the ink pickup must be able to return that ink to the reservoir at a pressure below which the bubble generator allows air into the reservoir. That pressure is the bubble pressure of the bubble generator and is also, after accounting for the elevation change between the bubble generator and the print head, the underpressure (or "partial vacuum") of the ink delivered to the print head. The pressure across the ink pickup is composed of "major" head loss through the length of the tube, "minor" losses associated with flow through the orifice or orifii at the tube's end, "minor" losses associated with the flow exiting the top of the tube, and the pressure associated with the elevation change from end to end of the pickup tube.

Usually two or more ink pickups (the drop tube 26 can also serve as an ink pickup) can share the flow of ink back into the reservoir. However, when ink is pooled in only one corner of the catchbasin, only one ink pickup will flow ink and the pickup must be sufficiently sized to avoid a pressure drop which exceeds the bubble generator's bubble point. The ink pickups need not be exactly in the corners of the catchbasin in order to pick up all of the ink. Surface tension forces will help pull the ink "at a distance." For ink with a surface tension of 62 dyne/cm., the pull range is about 0.10 inches.

Ink pickups not immersed in ink are essentially "dead." They have no flow of air or ink. Air cannot bubble in through their orifii since the bubble point of the orifii is much higher than (1) the bubble point of the bubble generator, and therefore, (2) the maximum pressure across the ink pickups.

As noted, it is important that ink remain in the ink pickups. When the pen is oriented as in FIG. 2, the pickups 42 retain ink even when the reservoir is at a higher pressure than the catchbasin, due to the capillarity of the basic tube. Even if mechanical energy is added in the form of a physical shock, ink will remain in the tube provided that the orifii are small enough to retain ink. Fundamentally then, the designer should reduce the diameter of the ink pickup orifii consistent with allowing enough flow at pressure that are not too high (as explained above). This results is a physically robust pen. The bore of the ink pickup should also be reduced, according to the same ink flow constraints, and for the same reasons. When the pen is inverted, the ink is held in the ink pickups since it is pulling down on the menisci in the ink pickup orifii (and it is easy for these to have a bubble pressure of at least the negative pressure produced by the weight of ink in the ink pickup tube multiplied by the accelerations the pen must survive).

From the foregoing, it will be recognized that a pen according to the present invention has a great number of advantages over competing systems. One is its volumetric efficiency. Since the catchbasin need not be sized to contain an unpredictably large volume of overflow ink, a substantial reduction in its size can be made without risking ink spillage. The pen is also able to survive multiple altitude or temperature cycles without leaking ink. As can be recognized from an inspection of FIGS. 4A–4D, a pen according to the present invention can be operated even in a nearly horizontal position. Finally, the invention does not require sealing of the pen's print head and vent while it is being transported.

Having described and illustrated the principles of my invention with reference to a preferred embodiment and several variations thereof, it should be apparent that the invention can be modified in arrangement and detail without departing from such principles. For example, while the invention has been illustrated with reference to a plurality of ink pickup tubes to completely drain the catchbasin, a similar result can be achieved by filling the catchbasin with foam to draw ink from the corners to one or more coupling orifii. Similarly, while the invention has been described with reference to a pen that includes both a drop tube/bubble generator and a plurality of ink pickup tubes, in alternative embodiments, one of the ink pickups may serve also as a drop tube/bubble generator.

In view of the wide range of embodiments to which the principles of the present invention can be applied, it should be understood that the apparatus illustrated is to be considered illustrative only and not as limiting the scope of the invention. Instead, my invention is to include all such embodiments as may come within the scope and spirit of the following claims and equivalents thereto.

I claim:

1. An ink jet pen comprising:

- an ink reservoir for containing ink;
- a drop ejector for ejecting ink droplets from the ink reservoir to a printing medium;
- an orifice for introducing air bubbles to the ink reservoir to moderate the reservoir underpressure caused by the ejection of ink therefrom, and for permitting ink to be displaced from the reservoir when air therein expands;
- a catchbasin coupled to the reservoir through said orifice for receiving said displaced ink; and
- ink pickup means coupling the catchbasin to the ink reservoir for returning ink from the catchbasin to the reservoir when the air in the catchbasin contracts.

2. The ink jet pen of claim 1 in which the ink pickup means comprises a plurality of tubes extending from the ink reservoir into different portions of the catchbasin.

3. A method of operating an ink jet pen that includes an ink reservoir, a catchbasin and an orifice coupling the reservoir and catchbasin, comprising the steps:

- flowing ink from the reservoir to the catchbasin through the orifice when air in the reservoir expands; and
- flowing substantially all of the ink from the catchbasin back to the reservoir when air in the reservoir contracts regardless of the orientation of the pen.

4. A method of operating an ink jet pen that includes an ink reservoir, a catchbasin and an orifice coupling the reservoir and catchbasin, comprising the steps:

- displacing ink from the reservoir to the catchbasin through the orifice when air in the reservoir expands;
- drawing ink from the catchbasin back to the reservoir through the orifice when air in the reservoir contracts and the orifice is wetted by ink in the catchbasin; and
- drawing ink from the catchbasin back to the reservoir through a means other than said orifice when air in the reservoir contracts and the orifice is not wetted by ink in the catchbasin.

* * * * *